Figure 1:
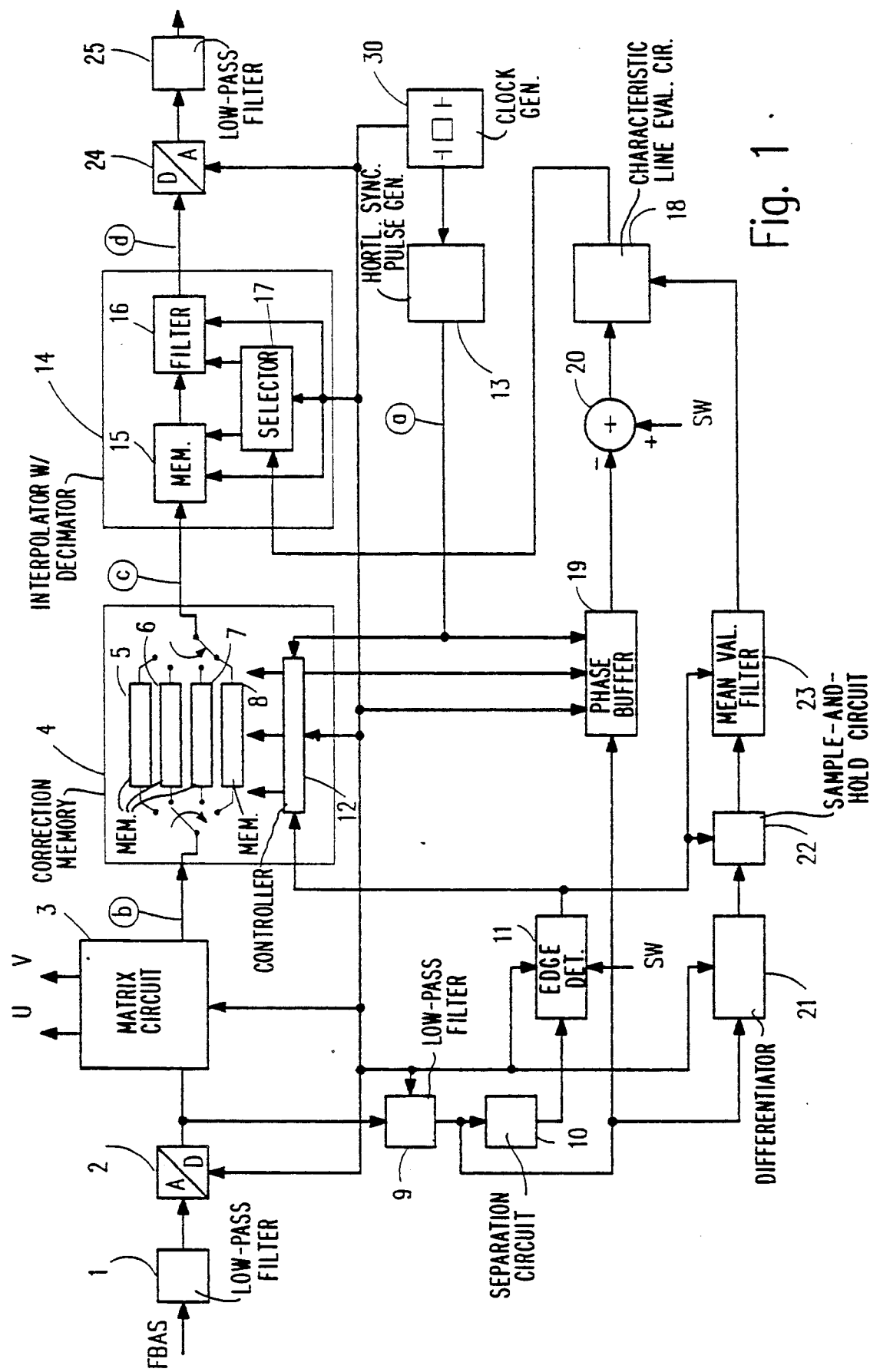

United States Patent [19]

Herrmann

[11] Patent Number: 5,121,207
[45] Date of Patent: Jun. 9, 1992

[54] DIGITAL CIRCUIT ARRANGEMENT FOR PROCESSING AN ANALOG VIDEO SIGNAL AT A FREE RUNNING SYSTEM CLOCK

[75] Inventor: Matthias Herrmann, Brunswick, Fed. Rep. of Germany

[73] Assignee: U.S. Philips Corporation, New York, N.Y.

[21] Appl. No.: 599,336

[22] Filed: Oct. 17, 1990

[30] Foreign Application Priority Data

Oct. 25, 1989 [DE] Fed. Rep. of Germany ....... 3935453

[51] Int. Cl.$^5$ ............................................... H04N 5/14
[52] U.S. Cl. ..................................... 358/160; 358/148
[58] Field of Search .......................... 358/148, 149, 160

[56] References Cited

U.S. PATENT DOCUMENTS

| | | | |
|---|---|---|---|
| 4,065,787 | 12/1977 | Owen et al. | 358/160 |
| 4,623,922 | 11/1986 | Wischermann | 358/160 |
| 4,672,447 | 6/1987 | Möring et al. | 358/148 |

Primary Examiner—Victor R. Kostak
Attorney, Agent, or Firm—Edward W. Goodman

[57] ABSTRACT

In a digital circuit arrangement for processing an analog video signal, which operates at a fixed system clock not coupled to the video signal, in which the video signal is sampled and which comprises a correction memory (4) and an interpolator with decimator (14) which are used for converting the digital video signal to a synchronizing signal raster predetermined by the system clock, there is provided that the correction memory (4) has a predetermined number of memory sections (5, 6, 7, 8) arranged for storing each the sample values of one picture line which sample values are written or read out at the system clock, that each horizontal synchronizing pulse of the still unconverted video signal triggers a writing process of the subsequent picture line into a memory section (5, 6, 7, 8) and that each horizontal synchronizing pulse derived from the system clock triggers a reading process of the picture line that follows the previously read picture line.

18 Claims, 2 Drawing Sheets

DIGITAL CIRCUIT ARRANGEMENT FOR PROCESSING AN ANALOG VIDEO SIGNAL AT A FREE RUNNING SYSTEM CLOCK

BACKGROUND OF THE INVENTION

1. Field of the Invention

The invention relates to a digital circuit arrangement for processing an analog video signal, which operates at a fixed system clock that is not coupled to the video signal, in which a digital video signal available at the system clock is processed and which comprises a correction memory and an interpolator with decimator which are used for converting the digital video signal to a synchronizing signal raster predetermined by the system clock.

2. Description of the Related Art

A circuit arrangement of this type is known from the publication "Fernseh- und Kino-Technik", vol. 40, No. 3/1986, pp. 105 to 111. In this publication the basic mode of operation of a television receiver operating at a free running clock is briefly described. Free running clock in this respect is understood to denote that the system clock at which the video signals converted into the digital mode are processed, is totally independent of the video signal and is thus independent of either its color burst frequency or its horizontal frequency. Above publication states that a buffer and an interpolator may be provided for eliminating the asynchronism between the input signal sampled at the system clock and a horizontal and vertical deflection raster derived from the free running system clock. A more detailed mode of operation of this buffer and interpolator cannot be understood from this publication.

European Patent Application EP-A 0,300,633 discloses an arrangement for time-base error correction which samples video signals at a fixed clock rate, processes them at the same rate and reconverts these signals into the analog mode. The purpose of that arrangement is to correct time-base errors in the analog input signal. The arrangement comprises an adaptive interpolation filter which is used for generating the values of the sampled video signals at the instants which would have been sampling instants if no time-base errors had occurred. For this purpose, the adaptive interpolation filter stores eight successive sample values of the digital video signal in a shift register. Each time four of the stored sample values are multiplied by evaluation factors and subsequently added together. In this manner a time-base error correction is made of which the time error is smaller than a sample period. In order to correct time errors, which are integer multiples of the sample period, the appropriate four sample values are selected from the sample values stored in the shift register. Thus, it is possible for this filter to perform a time-base error correction in integer multiples of the sample clock within a narrow time-dependent range of several sample values and also, by means of interpolation, to compensate for time-base errors which are smaller than a sample period.

SUMMARY OF THE INVENTION

It is an object of the invention to provide an improved and practically realizable digital circuit arrangement of the type mentioned in the preamble.

This object is achieved according to the invention in that the correction memory has a predetermined number of memory sections each arranged for storing the sample values of one picture line, the sample values being written or read out at the system clock, in that each horizontal synchronizing pulse of the still unconverted video signal triggers a writing process of the subsequent picture line into a memory section and in that each horizontal synchronizing pulse derived from the system clock triggers a reading process of the picture line that follows the previously read picture line.

In the circuit arrangement, the analog video signal is sampled at the fixed system clock which is not coupled to the video signal. In this manner a digital video signal is obtained whose sample clock is out of synchronism with the input signal. In this respect there is the basic advantage that the frequency of the system clock may be selected arbitrarily while observing, however, the requirement of the sample theorem. Furthermore, this single, freely selectable clock is advantageous in the case where field or frame memories are used, in that its frequency may be selected such that the memory circuitry and cost can be kept at the lowest possible level. Vis-a-vis further known solutions for which a memory is used for the time-base error correction of video signals, the memory being written or read out, respectively, at various clocks, the write clock usually being coupled to the video signal itself in one way or another, it is all the more advantageous because no interference between various clocks may arise as there is only one clock and because phase-locked loops and the like for coupling one of the clocks to the video signal are rendered superfluous.

The digital video signal produced in the manner described above, which comprises the horizontal synchronizing signal, is written into the correction memories in dependence on the pulses of this horizontal synchronizing signal. Each horizontal synchronizing pulse causes the subsequent line to be written into a memory section of the correction memory. In this manner the memory sections of the correction memory are consecutively written with the consecutive picture lines.

The process of reading the picture lines from the memory sections is now performed in dependence on a horizontal synchronizing signal which is no longer dependent on the video signal, but is generated in dependence on the uncoupled system clock. At each thus generated pulse of a horizontal synchronizing signal, a picture line is read from a memory section of the correction memory. Needless to say, the picture lines are read out from the memory sections in the same order as they were written. The horizontal synchronizing signal generated in dependence on the system clock is naturally generated in a manner so that pulses occur at the same distance in time as in the horizontal synchronizing signal contained in the video signal. This theoretical correspondence of the two signals, however, is not always the case in practice, because time-base errors may occur. This especially holds for the reproduction of video signals by a video recorder.

In the case where such a time-base error occurs, the pulses of the two horizontal synchronizing signals are no longer in synchronism. This asynchronism of the signals is compensated for by means of the correction memory. However, the correction memory is only capable of compensating for an asynchronism in integer multiples of the sample rate. In the above-described method of operation of the correction memory this is effected automatically, so that the two horizontal synchronizing pulses no longer occur simultaneously. In that case the writing and reading processes of the picture lines are no longer performed in synchronism.

As demonstrated by practical tests, even with signals from video recorders, long term mean of the described phase difference between the two signals may be assumed to be about zero so that no overflow of the correction memory will occur.

Once the already converted video signal has left the correction memory, it is applied to the interpolator with decimator, which operates as described in European Patent Application EP-A 0,300,633. In the interpolator with decimator, a further fine-conversion is performed, that is to say, a phase compensation shorter than a sample period. This is effected by oversampling the digital television signal and computing intermediate values. According to the complexity of the interpolator with decimator, for example, up to 16 intermediate values may be computed between two sample clocks. After the video signal has left the interpolator with decimator it is substantially completely in synchronism with the horizontal synchronizing signal raster predetermined by the system clock.

For this phase compensation to be performed as accurately as possible, it is necessary to detect the pulses of the two horizontal synchronizing signals most accurately. This especially holds for the horizontal synchronizing signals contained in the television signal, because level fluctuations or fluctuations of the steepness of the pulse edges often occur as a result of transmission disturbances or, for example, when reproduction is effected by means of a video recorder. For this reason, according to a further embodiment of the invention, there is provided that the still unconverted digital video signal is applied to a low-pass filter and thereafter to a separation circuit in which the horizontal synchronizing pulses contained therein are separated and which is followed by an edge detector in which it is detected when the trailing edges of the pulses reach a predetermined nominal value and the detector applying, as required, a control signal to the correction memory for triggering a writing process for a picture line, and in that a reading process is triggered each time the trailing edges of the horizontal synchronizing pulses derived from the system clock reach the predetermined nominal value.

According to a further embodiment of the invention, there is provided that the picture line data are written into the memory sections during a write cycle in which the data of each picture line are written into the individual memory sections in a predetermined order, the first memory section being re-started with after the last section has been written, and in that the data are read out in a similar cycle which, compared to the write cycle, is shifted by a preset number of memory sections if it is not necessary to convert the video signal to the system clock.

As has already been stated above, it has appeared that the long term mean of the phase differences between the synchronizing signal raster contained in the input signal and the synchronizing signal raster generated in dependence on the system clock is about zero. For this reason, it is not necessary for the correction memory to have, for example, as many memory sections as a picture has picture lines. It would rather suffice to have a relatively small number of memory sections which are written cyclically. This means that the memory sections are written into in a predetermined order and that after the last memory section has been written into, the first memory section that had already been written into previously, is written into again.

The reading process of the picture lines from the memory sections is performed during the same cycle. This read cycle, however, is shifted with respect to the write cycle by several memory sections. This shift of the two cycles can be increased or reduced as a function of the phase compensation to be effected.

For optimizing the use of the memory sections, it is advantageous, as is provided in a further embodiment of the invention, that the number of memory sections, by which the read cycle is shifted with respect to the write cycle if no conversion is to take place, is approximately half the total number of available memory sections.

It has appeared that even for the reproduction of video signals from a video recorder four memory sections are sufficient, as is provided according to a further embodiment of the invention.

According to a further embodiment of the invention, there is provided that one memory location of a phase buffer is fixedly allocated to each memory section of the correction memory and that upon detection of the trailing edge of a horizontal synchronizing pulse of the unconverted video signal, the next sample value of the video signal is stored in the memory location allocated to the memory section into which a next picture line is written, as a measure for the conversion to be effected by the interpolator with decimator.

After a conversion of the video signal has taken place in the correction memory by integer multiples of the sample period, in order to compensate for phase differences between the input signal and the horizontal synchronizing signal raster of the system clock, a fine-conversion, which causes a phase compensation smaller than a sample period, is to be effected by means of the interpolator with decimator. For this purpose, it is advantageous to store the next sample value of the video signal following the detection of a pulse of the horizontal synchronizing pulse contained in the video signal, because this sample value represents a measure for the conversion still to be performed by the interpolator with decimator in dependence on the height of the level this sample value represents. These sample values are stored according to the invention with a fixed allocation to the picture lines concerned. This is effected in that a memory location of a phase buffer is fixedly allocated to each memory section in the correction memory. The above-described sample value which belongs to the picture line stored in the corresponding memory section of the correction memory is then stored in that memory location.

When one of the picture lines is read from a memory section of the correction memory, the corresponding sample value is also read from its allocated memory location of the phase buffer and fed to the interpolator with decimator for the necessary conversion to be determined.

The height of the sample value is a measure for the conversion still to be performed. However, since the steepness of the edge of the horizontal synchronizing pulses contained in the video signal may fluctuate, which is often the case, for example, with video recorder reproduction, this may lead to an erroneous evaluation. Therefore, according to a further embodiment of the invention, there is provided that for each picture line the value sampled in the corresponding memory location of the phase buffer is applied to a characteristic line evaluation circuit which produces a control signal for the interpolator with decimator in response to the edge steepness of the horizontal synchronizing pulses averaged over a plurality of picture lines, this control signal representing for each picture line, an estimate for the conversion of the video signal to be performed by the interpolator with decimator.

Due to the averaging, the conversion to be performed can be directly derived from the height of the sample value stored in the memory location, independent of the edge steepness of the horizontal synchronizing pulses.

In order to take fluctuations of the video signal level into account, there is provided, according to a further embodiment of the invention, that each sample value read from a memory location of the phase buffer is applied to an adder in which a difference with a constant threshold value is formed and whose output signals are applied to the characteristic line evaluation circuit.

Because of this difference formation, the conversion to be performed can be derived from the difference, independent of the absolute level of the horizontal synchronizing pulses contained in the video signal.

The difference thus found is applied to the characteristic line evaluation circuit which supplies a control signal for the interpolator with decimator while taking into account the edge steepness of the horizontal synchronizing pulses averaged over a plurality of picture lines, this control signal representing for each picture line, a measure for the conversion of the video signal to be performed by the interpolator with decimator.

Superposed on the video signal and thus also on the horizontal synchronizing signal contained therein may be interference, such as noise or interference peaks. Due to the above-described averaging, the conversion to be performed can now be derived from the height of the sample value stored in the memory location of the phase buffer while taking the characteristic line evaluation into consideration and disregarding this interference.

The above-described mean edge steepness of the horizontal synchronizing pulses contained in the video signal may be obtained, according to a further embodiment of the invention, by means of a mean value filter in which for a plurality of picture lines the difference between each two successive sample values of the trailing edges of the horizontal synchronizing pulses contained in the video signal is computed and stored and in which a mean-value signal of these differences is produced, which is applied to the characteristic line evaluation circuit.

For the use in a color television receiver, for example, in a television set or a video recorder, there is provided according to a further embodiment of the invention that, subsequent to the analog-to-digital conversion, the video signal is applied to a separation circuit in which a separation into the luminance signal and the chrominance signal is effected, which chrominance signal is thereafter converted in a demodulator into the components U and V, that the correction memory and the interpolator with decimator have for each picture line three memory sections or memory locations respectively, for the luminance signal and the color components U and V and that the output signals of the interpolator with decimator are applied to three digital-to-analog converters.

The originally analog video signal is again available in analog form after the last digital-to-analog conversion. It is now subdivided into the luminance signal and the color component signals U and V. After the digital-to-analog conversion, these signals are only to be dematrixed and are then available as RGB signals to be shown on a screen.

Of great advantage is the use of the circuit arrangement in a television receiver which comprises a picture memory. For this purpose, according to a further embodiment of the invention, there is provided that a picture memory is inserted between the interpolator with decimator and the digital-to-analog converters.

If a picture memory is used, the circuit arrangement according to the invention is specifically suitable because it operates with an orthogonal sampling raster or reproduction raster of the video signal. Thus, if a picture memory is used, the implementation of three-dimensional digital filter techniques will be possible, such as, for example, luminance/chrominance separation without interference, flicker-free picture display and noise reduction.

Figure 2:
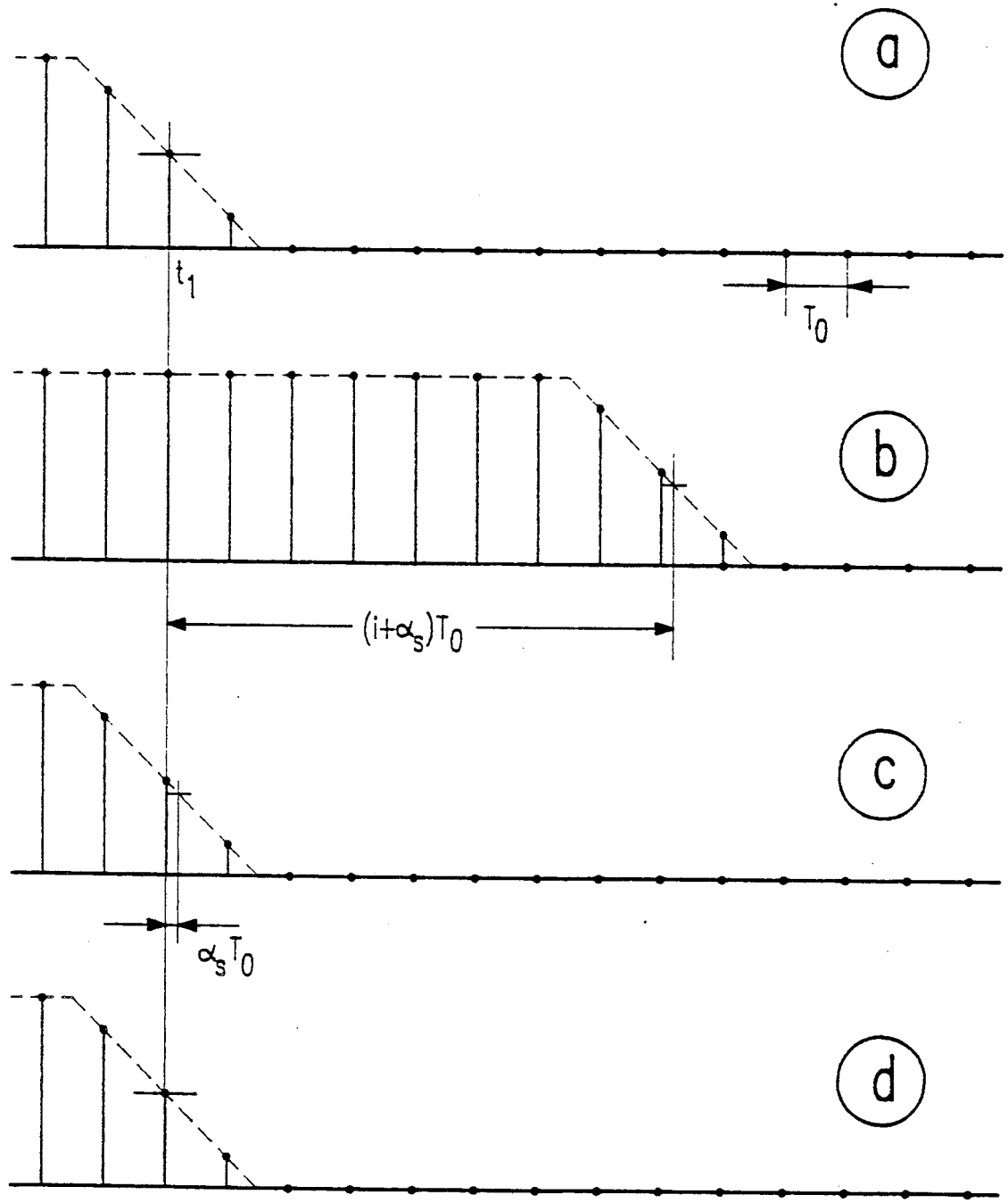

An exemplary embodiment of the invention will be further explained with reference to the drawing, in which:

FIG. 1 shows a block diagram of an exemplary embodiment of a circuit arrangement according to the invention; and FIG. 2 shows the time-dependent representation of several signals occurring in the circuit arrangement shown in FIG. 1.

FIG. 1 represents an exemplary embodiment of the circuit arrangement in the form of a block diagram. It is a diagrammatic representation of the complete signal processing from the analog-to-digital converter to the digital-to-analog converter. A circuit arrangement of this type may, for example, be used in a television receiver.

The analog video signal (referenced FBAS in FIG. 1), applied to the input of the circuit arrangement, is first applied to a low-pass filter 1, which is followed by an analog-to-digital converter 2. A clock signal, i.e., the system clock, produced by a clock generator 30 which, for example, may be a quartz oscillator, is applied to the analog-to-digital converter 2. In the analog-to-digital converter 2 a video signal is converted into the digital mode. The sample rate is then determined by the system clock. The system clock has a fixed frequency and is independent of the video signal. The clock rate may be chosen at will; one only has to see to it that the requirements of the sample theorem are fulfilled.

The digital video signal thus found is applied to a circuit block 3 represented only schematically in the Figure, in which block the luminance signal is separated from the chrominance signal and in which the chrominance signal is demodulated. The color signal components U and V formed during this process are further processed in the same manner as the luminance signal. For clarity, only the further processing of the luminance signal is represented in FIG. 1. This luminance signal is applied to a correction memory 4 which comprises four memory sections 5, 6, 7 and 8. Each of these memory sections is arranged for accommodating the data of a picture line of the luminance signal. Picture lines are cyclically and constantly written into the four memory sections 5, 6, 7 and 8. This implies that, for example, starting with memory sections 5, picture lines are consecutively written into the four memory sections. If the last memory section 8 has been written, memory section 5 will be written again, and so on. Writing a picture line into a memory section is triggered by the preceding pulse of each horizontal synchronizing signal contained in the digital video signal.

For this purpose, these pulses are detected in the following manner:

The output signal of the analog-to-digital converter 2 is applied to a low-pass filter 9, whose output signal is fed to a separation circuit 10, wherein the pulses of the horizontal synchronizing signal are separated. This separation circuit 10 is followed by an edge detector 11 in which it is detected when the trailing edge of the pulses reach a preset threshold value (SW). Once this is the case, the edge detector 11 will send an appropriate signal to a controller 12 included in the correction memory 4. After this signal has occurred, the controller 12 will trigger a writing process of the subsequent picture line into the next memory section. This writing process commences with the system clock pulse following the control signal of the edge detector 11.

The picture lines cyclically written into the four memory sections 5, 6, 7 and 8 of the correction memory 4 are read out from this memory also under the control of the controller 12. This reading process takes place in the same cycle, i.e. the memory sections 5, 6, 7 and 8 are read out in the same order in which, previously, the data were written. However, the read cycle in the exemplary embodiment shown in the Figure which comprises four memory sections, is shifted by two memory sections with respect to the write cycle. Starting from the fact that no conversion is possible, for example, memory section 7 is read out whereas, simultaneously, memory section 5 is written.

Reading a picture line from a memory section takes place in dependence on a horizontal synchronizing pulse derived from the system clock. For this purpose, a horizontal synchronizing pulse generator 13 is provided to which a clock signal from clock generator 30 is applied. The signal generated by the horizontal synchronizing pulse generator 13 is applied to the controller 12 of the correction memory 4. With each trailing edge of this horizontal synchronizing pulse, the above-described reading process of a picture line is triggered, which commences at the next pulse of the system clock after the trailing edge has been detected.

Since the memory sections 5 to 8 of the correction memory 4 are written in dependence on the horizontal synchronizing signal contained in the video signal, whereas the reading process is performed in dependence on the horizontal synchronizing signal controlled by the fixed system clock, there is thus a phase compensation between the input and output signals of the correction memory 4. Since the writing and reading processes of the data of the correction memory are performed at the system clock, the phase compensation between the two signals, i.e. the conversion of the video signal, can only be effected in integer multiples of the period of the system clock and thus also of the sample period. This means that the output signal of the correction memory may still contain phase shifts of the individual picture lines, which shifts are smaller than a sample period. However, since these phase variations are still optically annoying factors, the correction memory is followed by an interpolator with decimator 14 in which the remaining phase compensation smaller than a sample period is performed.

The interpolator with decimator 14 comprises an access memory 15 into which the data produced by the correction memory 4 are written. A shift register (not further represented in the Figure) is concerned here, which is also clocked at this system clock. The data stored in the access memory 15 are applied to a linear time-varying filter 16 which also forms part of the interpolator with decimator. This linear time-varying filter 16 operates with different factors by which sample values are multiplied so as to calculate intermediate values that lie among the sample values of the signal. The precise function of this filter per se will not be further discussed here; a filter of this type is known, for example, from European Patent Application EP-A 0,300,633 mentioned hereinbefore. The factors required by the filter for computing the intermediate values are selected by means of a selector 17, which also forms part of the interpolator with decimator 14. For determining the appropriate factors, however, one should know precisely which phase compensation between the two signals or which fine-conversion of the video signal is to be performed in the interpolator with decimator 14. For this purpose, selector 17 receives from a characteristic line evaluation circuit 18 a signal which indicates for each picture line what fine-conversion is to be performed by means of the interpolator with decimator.

The signal produced by the characteristic line evaluation circuit 18 is produced in the following manner:

A phase buffer 19 is connected after the low-pass filter 9. This phase buffer comprises memory locations not represented in the Figure. There are exactly as many memory locations as there are memory sections in correction memory 4. Each memory section 5 to 8 of the correction memory 4 is fixedly allocated a memory location in the phase buffer 19. When a trailing edge of a horizontal synchronizing pulse contained in the video signal is detected, the first sample value subsequent to the detection of the trailing edge is written into the associated memory location of the phase buffer 19 in addition to which the subsequent picture line is written into a memory section of the correction memory 4. The magnitude of this sample value, which is situated on the trailing edge of the horizontal synchronizing pulse, is already a primary measured value for the still existing phase shift.

With each process of reading a picture line from a memory section of the correction memory 4 its associated measured phase value is read from the phase buffer 19. The measured value, however, is then applied to an adder 20 in which it is subtracted from a threshold value (SW). In this manner it is ensured that the measured phase value becomes independent of the absolute amplitude levels of the video signal and thus independent of level variations. The output signal of the adder 20 is applied to the characteristic line evaluation circuit 18.

A unique evaluation of this signal by the characteristic line evaluation circuit 18 would, however, not take the steepness of the trailing edge of the horizontal synchronizing pulse into consideration. In this respect it should specifically be considered that the steepness of the pulse may vary or be completely different. This especially holds for signal reproduction by a video recorder.

Therefore, the output signal of the low-pass filter 9 is additionally applied to a differentiator 21 which is also clocked at the system clock. In the differentiator 21 the difference between two successive sample values is formed continuously. These differences are applied to a sample-and-hold circuit 22. This sample-and-hold circuit 22 also receives the control signal supplied by the edge detector 11, which control signal indicates a detection of the trailing edge of a horizontal synchronizing pulse contained in the video signal. With each detection the sample-and-hold circuit 22 applies the difference formed by the differentiator 21 to a mean value filter 23. Thus, for each trailing edge of a horizontal synchronizing pulse a difference is applied to this mean value filter 23. These differences indicate the steepness of the trailing edges of the horizontal synchronizing pulses. These values are continuously stored for a plurality of picture lines in the mean value filter 23. A mean value is formed from these stored values. This mean value is applied to the characteristic line evaluation circuit 18. The characteristic line evaluation circuit 18 now evaluates the signal produced by the adder 20 while taking into account the edge steepness of the horizontal synchronizing pulses averaged over a plurality of picture lines, which signal is a measure for the phase correction to be introduced. In this manner the control signal applied by the characteristic line evaluation circuit 18 to the selector 17 of the interpolator with decimator 14 is very precise. In the interpolator with decimator 14 an appropriate fine-conversion may be performed. The intermediate values calculated for this purpose, which are situated among the sample values of the video signal, are applied to a digital-to-analog converter 24. The digital-to-analog conversion takes place here also at the system clock. A low-pass filter 25 is connected after the digital-to-analog converter. The video signal is now again available in analog form at the output of this low-pass filter 25. This video signal has the proper phase condition with respect to the horizontal synchronizing signal raster predetermined by the horizontal synchronizing pulse generator 13.

A processing (not represented in the Figure) of the color component signals U and V takes place in the correction memory 4 and in the interpolator with decimator 14 in like manner. This means, for example, that in the correction memory 4 not one but three memory sections are available for each picture line, the luminance signal and the two color component signals of a picture line being written into the three memory sections. The same holds for the processing in the interpolator with decimator 14.

FIG. 2 shows various signal variations as functions of time as they occur in the circuit arrangement as shown in FIG. 1.

Curve a shows as a function of time the variation of the horizontal synchronizing pulse generated by the horizontal synchronizing pulse generator. In the time sections selected in FIG. 2 a trailing edge of a pulse of this signal can be recognized. This signal is a digital signal which occurs at discrete instants. The system clocks of the instants discussed are indicated by means of dots on the time axis in the representation as shown in FIG. 2. The distance between two clocks, thus the sample period, is referenced $T_0$ in the Figure. For determining the exact phase condition of the trailing edge of the horizontal synchronizing pulse, the pulse is compared to a threshold value which, in the example represented in the Figure, is equal to half the pulse height. In the curve a the level of the pulse falls short of this set value at instant $t_1$.

The set phase condition is predetermined by the horizontal synchronizing pulse generated by the horizontal synchronizing pulse generator represented by curve a.

The video signal represented in signal curve b should have the same phase condition as the synchronizing pulse shown in curve a. Actually, however, in the example represented in FIG. 2, the pulse shown in curve b of a horizontal synchronizing signal contained in the video signal does not have the same phase condition. Comparison in the edge detector 11 as shown in FIG. 1 of this signal to the threshold value SW produces rather a difference of an integer multiple i of the sample period $T_0$. In addition, there is also a phase shift of $\alpha_S$ of the sample period $T_0$. This phase shift $\alpha_S * T_0$ is smaller than the sample period $T_0$.

Since the digital video signal is written into the correction memory 4 as a function of the horizontal synchronizing pulses contained in the video signal and is read out from the correction memory 4 as a function of the horizontal synchronizing pulses produced by the horizontal synchronizing pulse generator in response to the system clock, a signal variation represented by curve c in FIG. 2 can be noticed at the output of the correction memory 4. By means of the correction memory 4 a correction of the phase shift $(i+\alpha_S)T_0$ has already been made at this point. However, there is still the phase shift of $\alpha_S * T_0$.

This phase shift is effected in above manner by means of the interpolator with decimator 14 which, for this purpose, receives for each picture line a signal from the characteristic line evaluation circuit 18, which signal represents a measure for the phase correction to be effected. The output signal of the interpolator with decimator 14 is shown in FIG. 2 by means of signal curve d. It will be evident that the trailing edge of the pulse represented in the Figure of the digital video signal is substantially in-phase with the trailing edge of the signal pulse produced by the horizontal synchronizing pulse generator 13, whose edge variation is shown in curve a. Thus, the video signal occurring at the output of the interpolator with decimator 14, which signal is available in analog form at the output of the low-pass filter 22, now has the right phase condition with respect to the synchronizing raster predetermined by the horizontal synchronizing pulse generator 13.

The circuit arrangement represented in FIG. 1 with its signal curves as shown in FIG. 2 may, for example, be inserted into a television receiver. In that case, a picture memory (not shown in the Figure) may be inserted between the interpolator with decimator 14 and the digital-to-analog converter 21 in which memory a further signal processing, for example, for noise reduction will then be effected.

I claim:

1. A digital circuit arrangement for processing an analog video signal, said digital circuit arrangement operating at a fixed system clock that is not coupled to the analog video signal, said digital circuit arrangement comprising an analog-to-digital converter for converting the analog video signal to a digital video signal at the system clock; a correction memory; and an interpolator with decimator which are used to convert the digital video signal to a synchronized raster signal predetermined by the system clock, characterized in that the correction memory has a predetermined number of memory sections each arranged for storing the sample values of one picture line, said sample values being written into and read out of the memory sections at the system clock, and said digital circuit arrangement further comprises means for detecting horizontal synchronizing pulses in said digital video signal and for triggering a writing process of a subsequent picture line into a memory section in response to each of said detected horizontal synchronizing pulses; and means for generating horizontal synchronizing pulses from said fixed system clock; and means for triggering a reading process of a picture line that follows a previously read picture line in response to each of said generated horizontal synchronizing pulses.

2. A digital circuit arrangement as claimed in claim 1, characterized in that the digital video signal is applied to a separation circuit in which a separation is effected into a luminance signal and a chrominance signal, said chrominance signal being converted into color components U and V, in that the correction memory and the interpolator have, for each picture line, three memory portions, respectively, for the luminance signal and the color components U and V, and in that the output signals of the interpolator with decimator are applied to three digital-to-analog converters.

3. Circuit arrangement as claimed in claim 2, characterized in that a picture memory is inserted between the interpolator with decimator and the digital-to-analog converters.

4. A digital circuit arrangement as claimed in claim 1, characterized in that said detecting means comprises a low-pass filter; a separation circuit coupled to an output of said low-pass circuit for separating the horizontal synchronizing pulses contained in the digital video signal; and an edge detector which detects when trailing edges in the separated horizontal synchronizing pulses reach a predetermined nominal value and applies, as required, a control signal to the correction memory for triggering a writing process for a picture line; and wherein the reading process is triggered each time trailing edges of the horizontal synchronizing pulses generated from the system clock reach the predetermined nominal value.

5. A digital circuit arrangement as claimed in claim 1 or 4, characterized in that each writing or reading process for a picture line, once it has been triggered commences at the next pulse of the system clock.

6. A digital circuit arrangement as claimed in claim 1 or 4, characterized in that the picture line data are written into the memory sections during a write cycle in which the data of each picture line are written into the individual memory sections in a predetermined order, a first of the memory sections being restarted with after a last of the memory sections has been written, and in that the data are read out in a similar cycle which, compared with the write cycle, is shifted by a preset number of said memory sections if it is not necessary to convert the digital video signal to the system clock.

7. A digital circuit arrangement as claimed in claim 5, characterized in that the picture line data are written into the memory sections during a write cycle in which the data of each picture line are written into the individual memory sections in a predetermined order, a first of the memory sections being restarted with after a last of the memory sections has been written, and in that the data are read out in a similar cycle which, compared with the write cycle, is shifted by a preset number of said memory sections if it is not necessary to convert the digital video signal to the system clock.

8. A digital circuit arrangement as claimed in claim 6, characterized in that the number of memory sections by which the read cycle is shifted with respect to the write cycle if no conversion is to take place, is approximately half the total number of memory sections.

9. A digital circuit arrangement as claimed in claim 7, characterized in that the number of memory sections by which the read cycle is shifted with respect to the write cycle if no conversion is to take place, is approximately half the total number of memory sections.

10. A digital circuit arrangement as claimed in claim 1 or 4, characterized in that four memory sections as provided.

11. A digital circuit arrangement as claimed in claim 5, characterized in that four memory sections are provided.

12. A digital circuit arrangement as claimed in claim 6, characterized in that four memory sections are provided.

13. A digital circuit arrangement as claimed in claim 7, characterized in that four memory sections are provided.

14. A digital circuit arrangement as claimed in claim 8, characterized in that four memory sections are provided.

15. A digital circuit arrangement as claimed in claim 9, characterized in that four memory sections are provided.

16. A digital circuit arrangement as claimed in claim 1, characterized in that said digital circuit arrangement further comprises a phase buffer having a plurality of memory locations each allocated to each of said memory sections of said correction memory, said phase buffer being coupled to receive said digital video signal and said generated horizontal synchronizing pulses, and when said detecting means detects each trailing edge of each horizontal synchronizing pulse in the digital video signal, a next sample value of the digital video signal is stored in the memory location allocated to the memory section into which the next picture line is written, an output signal from said phase buffer being coupled to said interpolator with decimator for controlling the conversion to be performed by said interpolator with decimator.

17. A digital circuit arrangement as claimed in claim 16, characterized in that said digital circuit arrangement further comprises a mean value filter coupled to said detecting means in which for a plurality of picture lines, a difference between each pair of two successive sample values of the trailing edges of the horizontal synchronizing pulses contained in the video signal is computed and stored and in which a mean-value signal is produced, and a characteristic line evaluation circuit receiving said mean-value signal and coupled between an output of said phase buffer and said interpolator with decimator, said characteristic line evaluation circuit producing a control signal in response to said mean-value signal, said control signal representing, for each picture line, an estimate for the conversion of the digital video signal to be performed by the interpolator with decimator.

18. A digital circuit arrangement as claimed in claim 17, characterized in that the output signal from said phase buffer is applied to an adder circuit in which a difference is formed with a constant threshold value, said difference being applied to said characteristic line evaluation circuit.

* * * * *